J. McC. COLEMAN.
CAR BODY AND TRUCK LOCKING DEVICE.
APPLICATION FILED NOV. 14, 1911.
1,061,984.
Patented May 20, 1913.
2 SHEETS—SHEET 2.
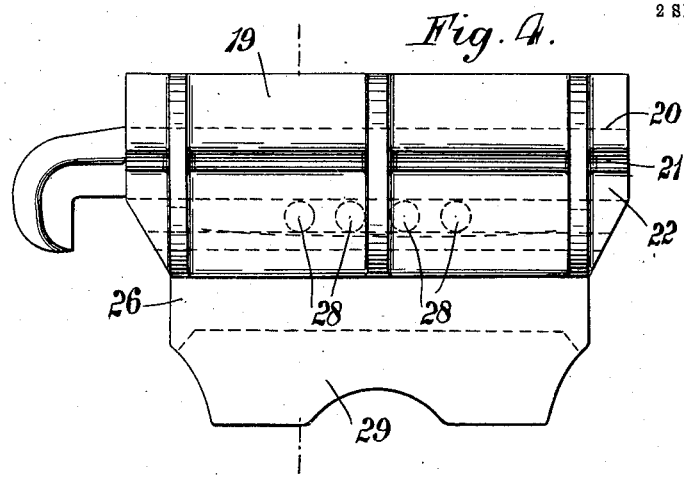
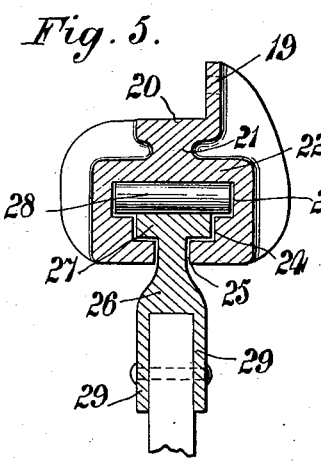
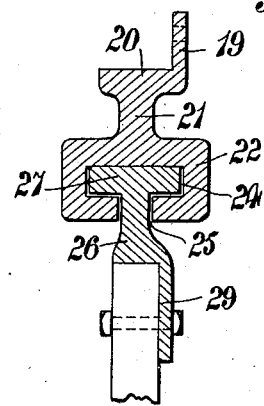
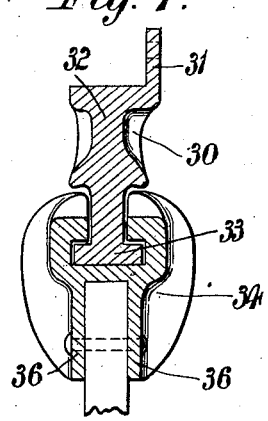

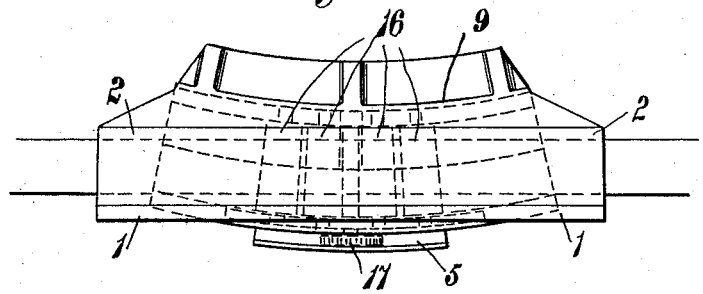
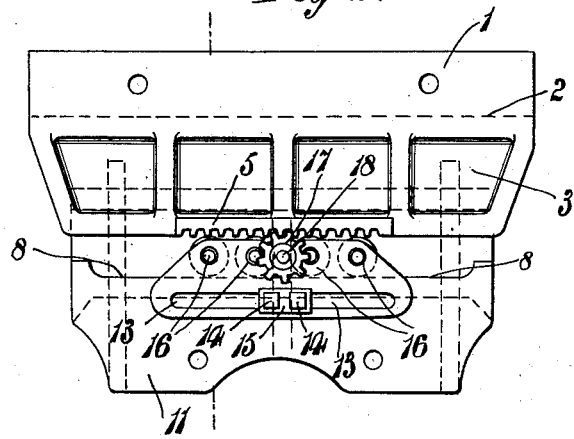
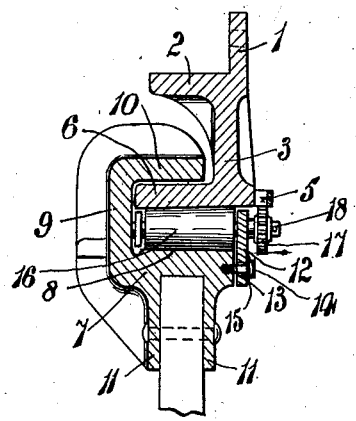

UNITED STATES PATENT OFFICE.

JAMES McCUTCHEON COLEMAN, OF WESTMOUNT, QUEBEC, CANADA.

CAR BODY AND TRUCK LOCKING DEVICE.

1,061,984.            Specification of Letters Patent.          Patented May 20, 1913.

Application filed November 14, 1911. Serial No. 660,207.

*To all whom it may concern:*

Be it known that I, JAMES MCCUTCHEON COLEMAN, a citizen of the United States of America, and resident of 356 Olivier avenue, in the city of Westmount, in the Province of Quebec, in the Dominion of Canada, have invented certain new and useful Improvements in Car Body and Truck Locking Devices; and I do hereby declare that the following is a full, clear, and exact description of the same.

The invention relates to improvements in car construction, and particularly to the bearings sustaining the weight of the body on the trucks, as described in the present specification and illustrated in the accompanying drawings that form part of the same.

The invention consists essentially in the novel construction and arrangement of parts, whereby the bearing member from the body of the car, meets the bearing member on the truck of the car and one of said members is provided with a flange or flanges embracing the flange or flanges of the other member and thus effectually ties the car and truck together.

The objects of the invention are to effect a secure joint between the car body and the truck and thus avoid the parting of said truck and car body in the event of unforeseen contingencies, and generally to provide a simple, safe and durable means of locking two parts of the car together.

In the drawings, Figure 1 is a plan view from above of one form of this invention, applied to a side bearing. Fig. 2 is a front elevation in the form illustrated in Fig. 1. Fig. 3 is a cross sectional view of the same form of the invention. Fig. 4 is a front elevation of another form of the invention applied to a side bearing. Fig. 5 is a cross sectional view of the form of the invention illustrated in Fig. 4. Fig. 6 is a cross sectional view of a slightly modified form of the invention. Fig. 7 is a cross sectional view, showing still another form of the same invention.

Like numerals of reference indicate corresponding parts in each figure.

Referring to the drawings, in Figs. 1, 2 and 3, 1 is a vertical flange through which the upper member of the bearing is secured to the body bolster or other extension from the car body. 2 is a horizontal flange extending under the particular part of the bolster or extending member from the car body and at right angles to the vertical flange 1. 3 is the web portion of the upper member having an outwardly bowed portion terminating at its lower end in the rack 5, said rack being an arc-shaped toothed rack. 6 is an inwardly extending horizontal flange from the lower end of the web portion 3 and having an arc-shaped inner edge and surface finished on the under side and forming one of the main features of this invention. 7 is the body portion of the lower member of the bearing having on the upper side thereof an arc-shaped track portion 8 flanged at the rear by the longitudinal arc-shaped wall 9 from the top of which extends outwardly the flange 10 immediately over the flange 6 and forming a main feature of this invention, there being sufficient distance between the said flanges 6 and 10 for the ordinary play of the bearing, said flange 10 terminating adjacent to the rear face of the web portion 3. 11 are flanges forming a jaw into which extends a part of the truck bolster, said flanges 11 being rigidly secured to said part of the truck bolster. 12 is a plate having the longitudinal slot 13 through which the cap screws 14 extend into the body portion 7, immediately below the track surface 8, the heads of said cap screws abutting the washer 15 and said washer abutting the surface of the plate 12 adjacent to the edges of the slot 13. The plate 13 is arc shaped longitudinally, corresponding to the contour of the outer surface of the body portion 7 and is adapted to slide on the cap screws 14, longitudinally over the outside surface of said body portion. 16 are rollers journaled in the upper portion of said plate 12 and correspondingly journaled on the inner side and rolling on the track surface 8, being engaged on the upper side by the under face of the flange 6 on the car body bearing downwardly. 17 is a pinion journaled on a pin 18 extending outwardly from the plate 12, said pinion coacting with the rack 5 and operated by the movement of said rollers, thereby providing a perfect guide for said rollers in their travel in respect to the various different positions assumed by the body in respect to the truck.

It will be seen by the foregoing description, that the upper member is locked within the lower member by the inwardly extending flange, said flange in itself forming a bearing surface on the rollers, if such are used, consequently the truck and the body cannot be separated, except by the complete destruction of these bearing parts.

In Figs. 4, 5, 6 and 7, the variations are shown particularly in regard to the number of flanges, that is to say, having double flanges in place of single flanges and single flanges in place of double flanges. In Figs. 4 and 5, 19 is the flange corresponding to the flange 1 in the former figures. 20 is the part corresponding to the flange 2. This part 20 is shown as joined by the neck 21 to the longitudinally recessed member 22, the recess portion having a roller recess 23 below which is a recess 24 of smaller dimensions leading to the longitudinal opening 25, said part 22 being arc-shaped longitudinally. 26 is the lower bearing member correspondingly arc-shaped and having a T-head 27, fitting into the recess 24 and bearing the rollers 28, said rollers being in the roller recess 23. 29 are flanges extending downwardly from the lower bearing 26 and embracing part of the truck bolster. The only differences in the construction of the invention, as illustrated in Fig. 6, are that in the upper member, the roller recess 23 is omitted and one of the lower flanges. In Fig. 7, there is a more material change for the upper member 30, while having a similar vertical flange 31 to be secured to the body bolster extending upwardly from the outer side of the web portion 32, differs at the lower end in having an inverted T-head 33 corresponding to the T-head 27 of the lower member in Fig. 5, said T-head 33 from the upper member being inclosed in the lower bearing member 34 in a corresponding recess 35, said lower bearing 34 having the flanges 36 or single flange, if desired, secured to the truck bolster.

The forms of the invention which have been described herein are the most likely ones to be used, though may be changed still further, without departing from the essential features and further the bearing with slight modifications may be arranged to form a center bearing instead of a side bearing as has been described in the present specification, the salient feature being locking the body and the truck together by means of flanged members not joined otherwise than by their respective positions on the body and the truck.

What I claim as my invention is:

1. In truck construction, an upper bearing member having a web portion formed between lateral flanges and a vertical flange above said web portion adapted to be rigidly connected with the car body, a lower bearing member having a track surface on the upper side of the body thereof, a wall at the rear of said track portion and a flange extending over said track portion from said wall and over the lower flange of the said upper member and a flange extending downwardly from said body portion and adapted to be rigidly connected with the truck and rollers traveling on said trackway under the lower flange of said upper member.

2. In truck construction, an upper member having an inwardly extending flange at the lower end thereof and a toothed rack, a lower member having at the upper end thereof a recess portion into which said flange extends and at the lower end flanges rigidly connected with the truck, a plate slidably arranged on the outer side of said lower bearing member and closing in said recess, rollers journaled in said plate and suitably supported at their inner sides, and a pinion journaled from and supported by said plate and coacting with said rack in sliding said plates and rollers.

3. In a device of the class described, the combination with the body and truck bolsters of a car, of a joint between said bolsters comprising two members, one an upper member rigidly secured to said body bolster, and the other a lower member rigidly secured to said truck bolster, said upper member through said bolster forming a rigid downward extension from the body and having an under surface adapted to bear on an upper surface of the lower member one of said members having a horizontal flange engaging a corresponding horizontal flange formed on the other member and forming a flexible means of joining the bolsters and adapted to form a bearing to share the weight of the car body.

Signed at the city of Montreal, Province of Quebec, Canada, this seventh day of November, 1911.

JAMES McCUTCHEON COLEMAN.

Witnesses:
G. H. TRESIDDER,
H. R. GAYLOR.

Copies of this patent may be obtained for five cents each, by addressing the "Commissioner of Patents, Washington, D. C."